United States Patent
Tame

[11] Patent Number: 5,802,928
[45] Date of Patent: Sep. 8, 1998

[54] BOWDEN WIRE INSTALLATION HAVING A YIELDING DEFORMABLE ANCHOR MEMBER

[75] Inventor: Omar D. Tame, W. Bloomfield, Mich.

[73] Assignee: Atoma International, Inc., Ontario, Canada

[21] Appl. No.: 769,927

[22] Filed: Dec. 9, 1996

[51] Int. Cl.[6] ....................................................... F16C 1/22
[52] U.S. Cl. ........................... 74/502.4; 74/500.5; 74/502
[58] Field of Search ............................... 74/502.4, 500.5, 74/502

[56] References Cited

U.S. PATENT DOCUMENTS

| | | | |
|---|---|---|---|
| 4,841,806 | 6/1989 | Spease | .................................... 74/500.5 |
| 4,995,669 | 2/1991 | Croft . | |
| 5,383,710 | 1/1995 | Premji . | |
| 5,558,403 | 9/1996 | Hammoud et al. . | |

FOREIGN PATENT DOCUMENTS 2081411  2/1982  United Kingdom .................. 74/502.4

*Primary Examiner*—Charles A. Marmor
*Assistant Examiner*—Ankur Parekh
*Attorney, Agent, or Firm*—Cushman Darby & Cushman IP Group of Pillsbury Madison and Sutro LLP

[57] ABSTRACT

The present invention is a Bowden wire installation comprising a Bowden wire assembly including an elongated flexible tube having opposite ends. A cable is slidably mounted in the flexible tube and has opposite end portions which extend outwardly from respective opposite ends of the flexible tube. Spaced movable members are connected to the opposite end portions of the cable. Spaced anchor members are connected to opposite ends of the flexible tube. One of the anchor members is disposed in a fixed operative position into which it has been yieldingly deformed from an initial position by movement of the end of the flexible tube connected in fixed relation therewith such that the material of the one of the anchor members is yieldingly deformed beyond an elastic limit thereof.

4 Claims, 8 Drawing Sheets

5,802,928

BOWDEN WIRE INSTALLATION HAVING A YIELDING DEFORMABLE ANCHOR MEMBER

This invention relates to the installation of motion transmitting assemblies of the type utilized in automotive vehicles and more particularly to the installation of Bowden wire assemblies.

BACKGROUND OF THE INVENTION

A Bowden wire assembly is a well known motion transmitting mechanism which is utilized in many applications within an automotive vehicle. Bowden wire assemblies are also utilized in many other environments. Basically, a Bowden wire assembly consists of two components; one, a flexible tube and, two, a cable which is slidably mounted within the tube with opposite end portions extending from opposite end portions of the tube. Typically, the installation requires that opposite ends of the cable must be connected to the two moving members between which the motion is to be transmitted and the anchoring of the two ends of the flexible tube so that the assembly will function properly. Typically, these connections require some means of adjustment during the installation in order to ensure that the assembly will function properly in operation. Typically, these adjustments are required at one or more of the connecting ends of either the cable and/or the flexible tube. Frequently, these adjustments become tedious and difficult to effect.

BRIEF DESCRIPTION OF THE INVENTION

It is an object of the present invention to provide a method of installing a Bowden wire assembly which obviates the necessity of the aforesaid end connection adjustments and, hence, obviates the problems noted above. In accordance with the principles of the present invention, this objective is achieved by providing a method of operatively installing between two movable members a Bowden wire assembly which includes an outer flexible tube slidably containing a cable with opposite end portions thereof extending outwardly of opposite ends of the flexible tube. The method comprises connecting opposite ends of the flexible tube to spaced anchoring points one of which is provided by a yieldingly deformable anchoring member disposed in an initial position with respect to an associated one of the movable members and connecting the ends of the cable to the movable members and positioning the same so that the associated one of the movable members is disposed at an intermediate position between maximum and minimum cable extent limiting positions thereof and the other of said movable members is disposed at a minimum cable extent position with respect to maximum and minimum cable extent limiting positions. Thereafter the other of the movable members is moved from the minimum cable extent position into the maximum cable extent position thereof so that during such movement after the associated one of the movable members has been moved thereby into the minimum cable extent limiting position thereof the end of the flexible tube connected to the yieldingly deformable anchoring member moves the anchoring member in a yieldingly deformable manner from the initial position into an operating position in a direction toward the associated one of the movable members.

Another object of the present invention is the provision of a Bowden wire installation which comprises a Bowden wire assembly including an elongated flexible tube having opposite ends and a cable slidably mounted in the flexible tube having opposite end portions which extend outwardly from respective opposite ends of the flexible tube, spaced movable members connected to the opposite end portion of the cable, and spaced anchor members connected to opposite ends of the flexible tube. One of the anchor members is disposed in a fixed operative position into which it has been yielding deformed by the end of the flexible tube connected therewith.

These and other objects of the present invention will become more apparent during the course of the following detailed description and appended claims.

The invention may best be understood with reference to the accompanying drawings wherein an illustrative embodiment is shown.

DETAILED DESCRIPTION OF THE INVENTION

Figure 1:
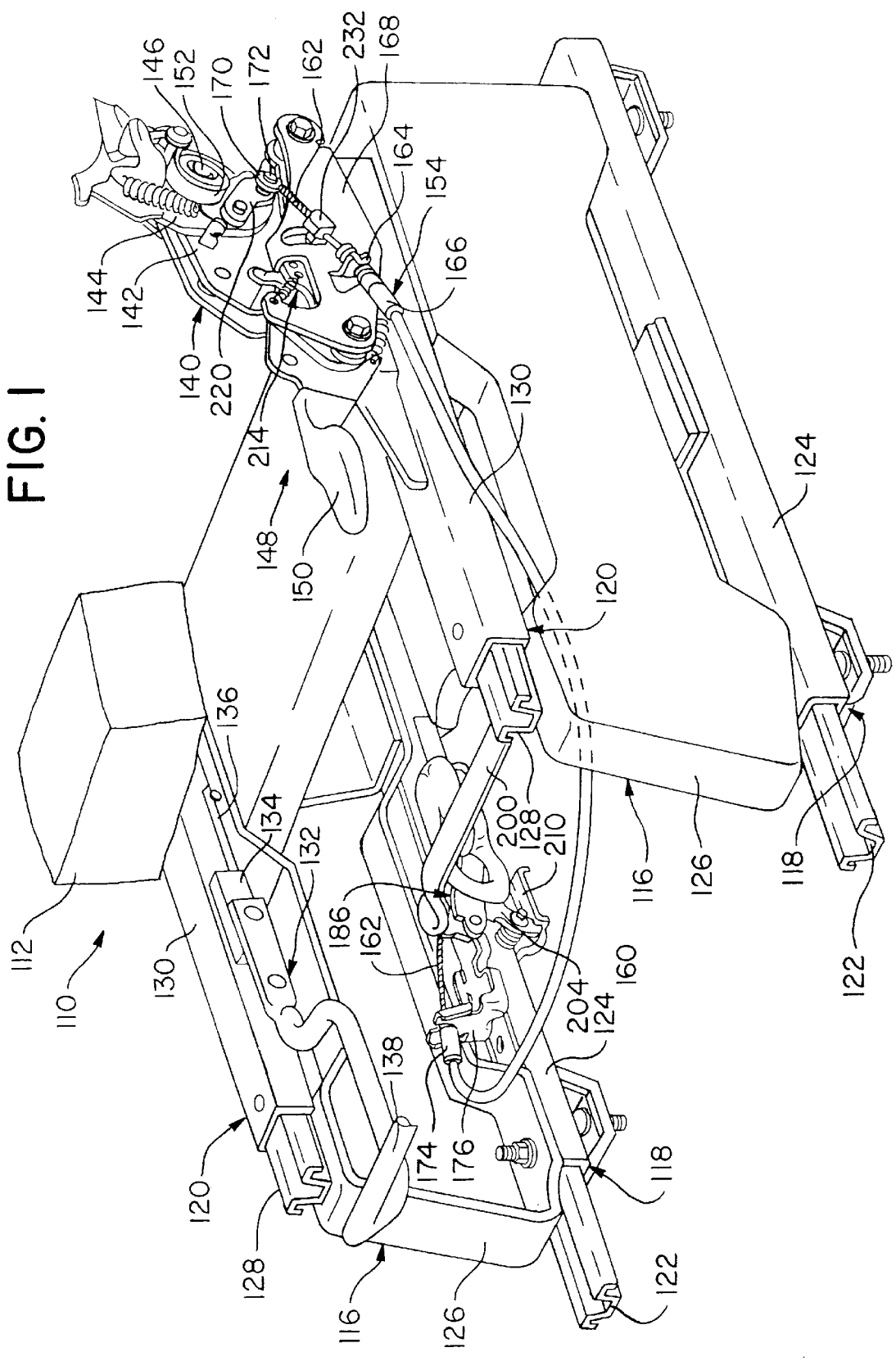
FIG. 1 is a partial perspective view of a vehicle seat having a Bowden wire assembly installed in accordance with the principles of the present invention, showing the seat with the seat back cushion assembly removed and other parts broken away for purposes of clearer illustration.
Figure 2:
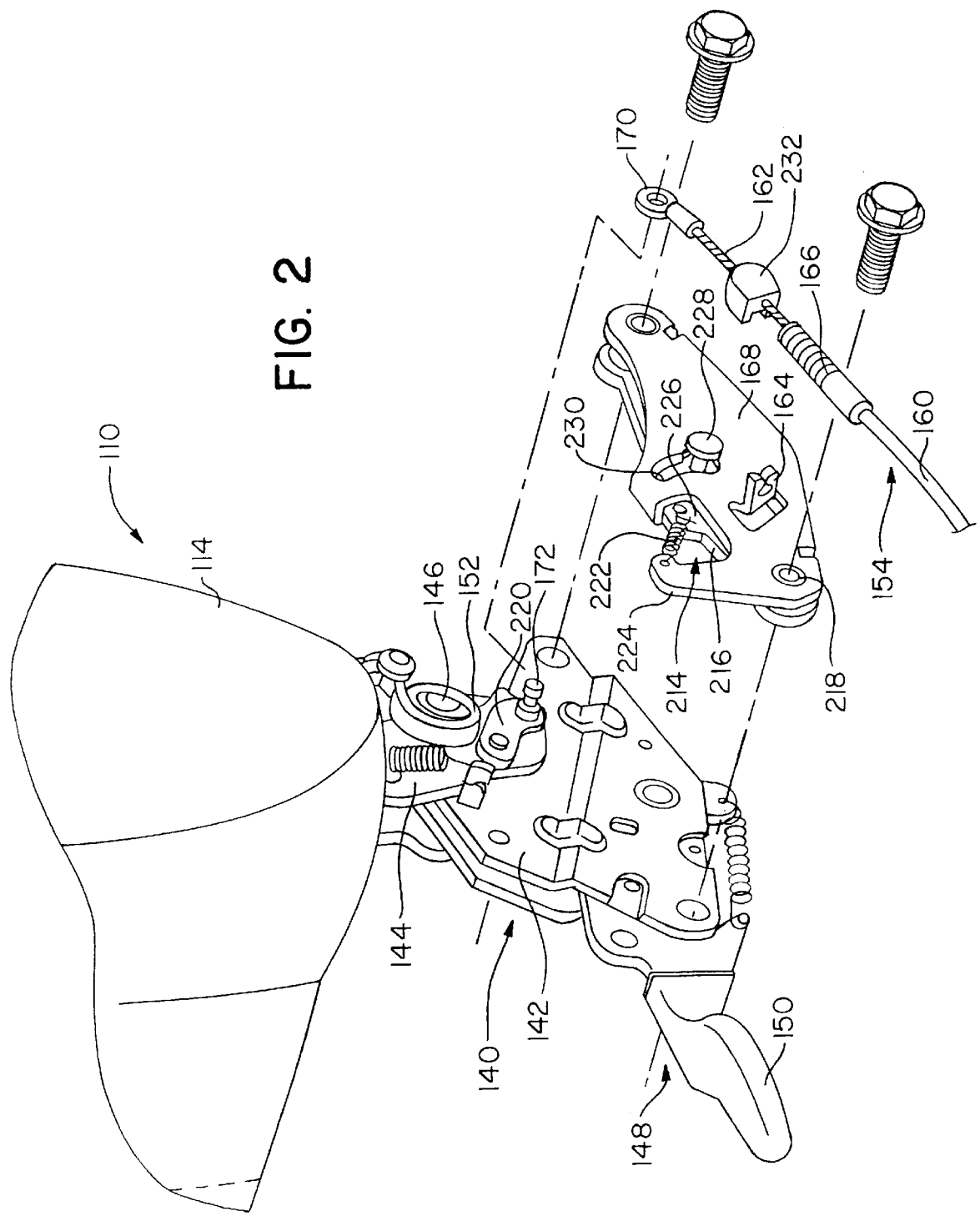
FIG. 2 is a partial exploded perspective view of the portion of the structure shown in FIG. 1 in the area of one end of the Bowden wire assembly.
Figure 3:
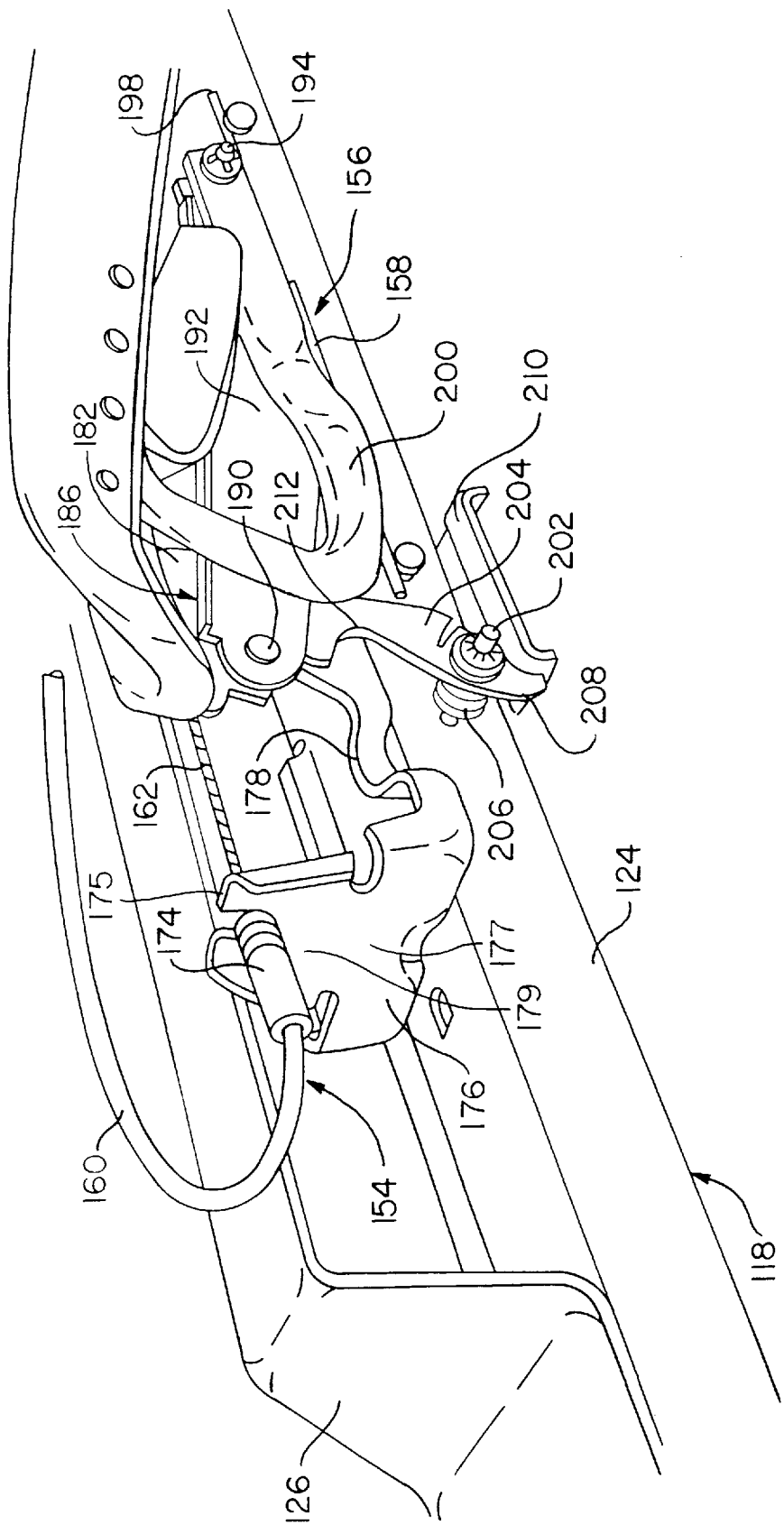
FIG. 3 is a perspective view of the portion of the structure shown in FIG. 1 in the area of the opposite end of the Bowden wire assembly including the releasable seat locking mechanism.

Referring now more particularly to FIGS. 1–8 of the drawings, there is shown therein one embodiment of a vehicle seat, generally indicated at 110, having a Bowden wire assembly embodied therein that is installed in accordance with the principles of the present invention. As best shown in FIGS. 1 and 2, the seat 110 includes the usual seat cushion assembly 112 and seat back cushion assembly 114. The seat cushion assembly 112 is of any well known construction including the usual frame, cushion and cover configured to accommodate a vehicle occupant when seated. Likewise, the seat back cushion assembly 114 may be of any well known construction including the usual frame, cushion and cover configured to support the back of a vehicle occupant seated on the seat cushion assembly 112.

As best shown in FIG. 1, the seat cushion assembly 112 is mounted on the vehicle floor for forward and rearward movements by a seat mounting assembly, generally indicated at 116. The seat mounting assembly 116 includes a lower set of tracks, generally indicated at 118, and an upper set of tracks, generally indicated at 120. The lower set of tracks 118 includes a pair of fore and aft extending lower track sections 122 mounted in fixed parallel relation on the vehicle floor and a cooperating pair of upper track sections 124 mounted on the fixed track sections 122 for forward and rearward movements with respect to the lower track sections 122. The seat mounting assembly 116 includes an intermediate mounting structure 126 which is fixedly mounted on the upper track sections 124 so as to be movable therewith with respect to the vehicle floor. The upper set of tracks 120 includes lower track sections 128 fixedly mounted on the intermediate mounting structure 126 and cooperating upper track sections 130 mounted on the lower track sections 128 for forward and rearward movements with respect to the lower track sections 128. The seat cushion assembly 112 is fixedly mounted on the upper track sections 130 so as to be movable therewith with respect to the vehicle floor.

Essentially, the set of upper tracks 120 provide for the movement of the seat cushion assembly 112 into a selected operating position within a range of operative positions while the lower set of tracks 118 provide for the movement of the seat cushion assembly 112 between the selected operating position and a seat access position disposed forwardly thereof. By providing these functions in separate mechanisms, it becomes possible to ensure that the seat cushion assembly 112 will be returned rearwardly from the seat access position into the exact selected operating position where the access cycle of movement was originated.

The seat mounting assembly 116 also includes a releasable seat locking mechanism, generally indicated at 132, associated with the upper set of tracks 120. As best shown in FIG. 1, the track sections 128 and 130 and the releasable seat locking mechanism 132 are preferably constructed in accordance with the disclosure of aforesaid copending U.S. patent application, Ser. No. 08/527,727, Docket No. 133, now U.S. Pat. No. 5,741,000. Although it will be understood that other constructions are contemplated as well. The embodiment shown includes a locking mechanism 132 for each pair of upper and lower track sections 128 and 130, with each locking mechanism 132 including a locking structure 134 mounted on the associated upper track section 130 for vertical movements between an upper locking position locking the seat mounting assembly 116 to fixedly retain the seat mounting assembly 116 in a seat operating position and a releasing position releasing the seat mounting assembly 116 to allow forward movement of the seat cushion assembly 112 from a seat operating position, as shown in FIG. 1, into a seat access position and rearward movement of the seat cushion assembly 112 from the seat access position into a seat operating position. The locking action is achieved by the movement of the locking structure 134 upwardly under the bias of a spring 136 into its locking position wherein portions of the locking structure 134 enter into downwardly facing notches formed in the fixed track sections 128. To reiterate, the fixed track sections 128 are formed with a multiplicity of longitudinally spaced downwardly facing notches enable the seat 110 to be locked in a plurality of different operating positions within a range of operating positions.

In the embodiment shown, the releasable seat locking mechanism 132 also includes a manually engageable structure 138 in the form of a U-shaped bail having its bight portion disposed under the forward portion of the seat cushion assembly 112 in a position to be conveniently gripped manually by a user. The legs of the U-shaped bail 138 are pivoted intermediate their lengths to the upper track sections 130 and the free ends of the legs are connected with the locking structures 134 so that the locking structures 134 will be moved downwardly against the bias of springs 136 from its locking position into its releasing position when the user pulls upwardly on the bight portion of the U-shaped bail 138.

As best shown in FIGS. 1 and 2, the seat 110 also includes a seat back mounting assembly, generally indicated at 140, which is disposed between the seat cushion assembly 112 and the seat back cushion assembly 114. The seat back mounting assembly 140 at each side of the seat includes a mounting bracket 142 fixed to the frame of the seat cushion assembly 112 and a mounting plate 144 fixed to the frame of the seat back cushion assembly 114 which is pivotally mounted on the mounting bracket 142 by a pivot pin 146.

The seat back mounting assembly 140 also includes a releasable seat back locking mechanism, generally indicated at 148. The locking mechanism 148 is of conventional construction as, for example, a mechanism such as disclosed in any one of U.S. Pat. Nos. 4,995,669 or 5,383,710. For the details of construction of the locking mechanism, reference may be made to the disclosure of the above two patents. For present purposes, it is sufficient to note that the locking mechanism includes a manually engageable structure 150 in the form of a lever which in a locking position retains a locking structure (not shown) in locking relation with respect to the seat back mounting assembly 140 to retain the seat back cushion assembly 114 in a seat back operating position. The lever 150 is movable from its locking position into a releasing position enabling the seat back cushion assembly to be moved forwardly about pivot pin 146 into a seat back access position overlying the seat cushion assembly 112.

In accordance with usual practice, the seat back mounting assembly 140 includes a torsion spring 152 for biasing the seat back cushion assembly 114 forwardly. The locking mechanism 148, as is the case in the aforesaid patents, may provide for the seat back cushion assembly 114 to be pivoted rearwardly about the pivot pin 146 through a range of seat back operating positions by the occupant simply pushing back on the seat back cushion assembly 114 when the locking structure is in a releasing position.

While in the embodiment shown the access movement and range of operating movements are provided by a single pivot, the present invention contemplates the utilization of a seat back mounting assembly and locking assembly which provides two spaced pivots in accordance with known practice. An exemplary embodiment of a two pivot assembly is disclosed in U.S. Pat. No. 5,558,403.

The seat 110 of the present invention also contemplates the provision of a motion transmitting mechanism, generally indicated at 154. The motion transmitting mechanism 154 is connected between the seat back cushion assembly 114 and a releasable seat locking mechanism, generally indicated at 156, operatively associated with the lower set of tracks 118. The cooperation between the motion transmitting mechanism 154 and the locking mechanism 156 is such that the movement of the seat back cushion assembly 114 from a seat back operating position into the seat back access position causes a locking structure 158 of the releasable locking mechanism 156 to be moved from its locking position into its releasing position.

Figure 4:
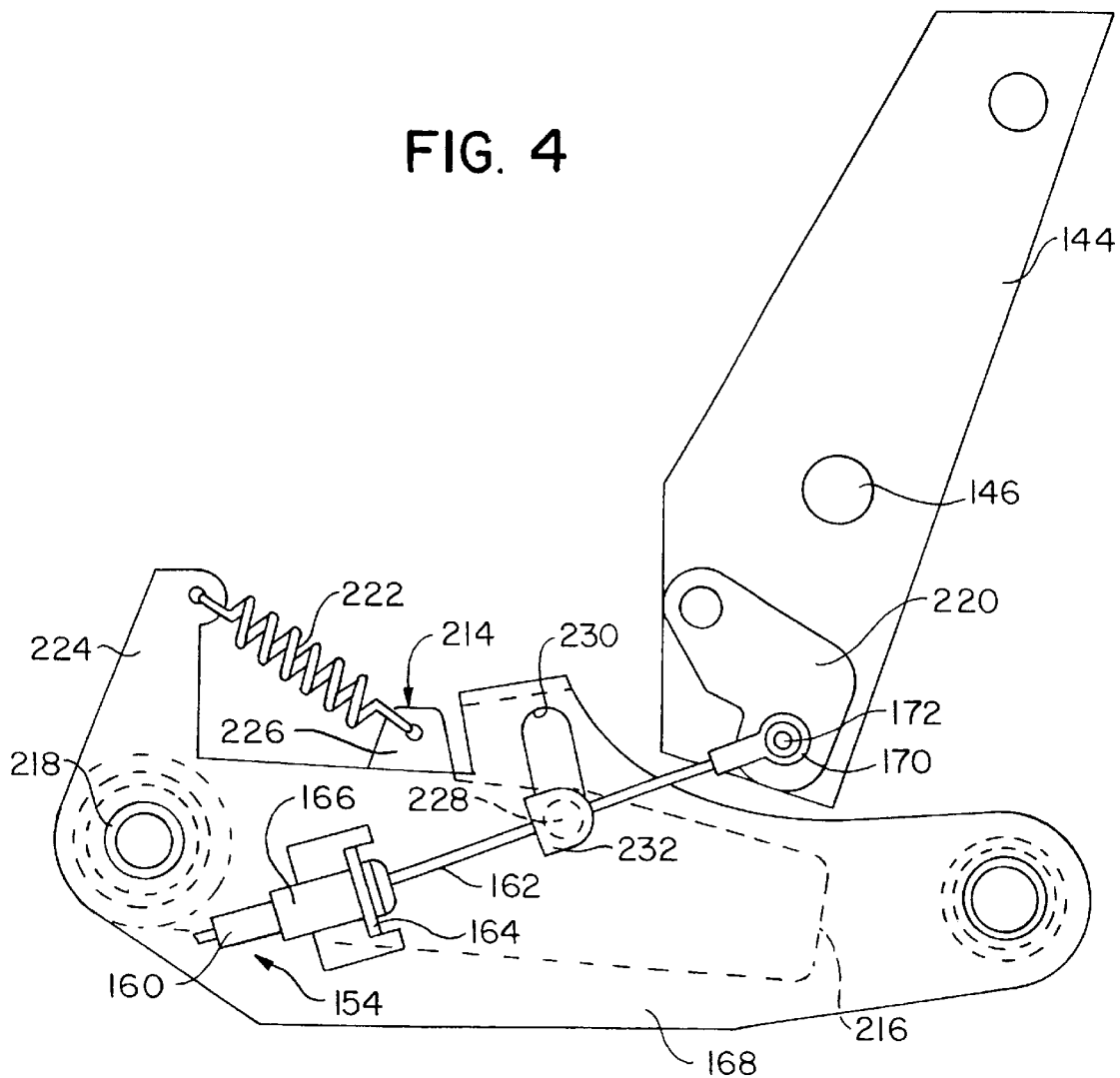
FIG. 4 is a side elevational view of the blocking mechanism and its cooperation with the Bowden wire assembly showing the blocking mechanism in its inoperative position and the Bowden wire assembly in an operative position.

The motion transmitting mechanism 156 is in the form of a Bowden wire assembly which includes a sheath or flexible tube 160 within which a cable 162 extends for guided longitudinal movement with respect thereto. As best shown in FIGS. 1, 2 and 4, one end of the flexible tube 160 is fixed to a bracket 164, as indicated at 166. The bracket 164 is struck from a mounting plate 168 which is carried by the seat cushion assembly 112, as by being fixed to the frame thereof and to mounting bracket 142. The adjacent end of the cable 162 is formed with an eyelet 170 which is connected to a pin 172. The pin 172 is fixed to the mounting plate 144 in spaced relation below the pivot pin 146.

As best shown in FIGS. 1, 3 and 6–8, the opposite end of the flexible tube 160 is suitably fixed, as indicated at 174, to a bendable bracket 176. Bendable bracket 176 is integrally formed on one end of a base structure 178 fixed to upper track 124 of an associated lower set of tracks 118. The opposite end of the base structure 178 is lugged to receive a pivot pin 180. A generally triangular shaped actuating member 182 is pivoted at one of its corners to the pivot pin 180 and is apertured at another corner to receive a cylinder member 184 fixed to the opposite end of the cable 162.

The actuating member 182 forms a part of a latchable actuating assembly, generally indicated at 186, for moving the locking mechanism 156 between its locking and releasing positions in response to the movement of the cable 162 of the Bowden wire assembly 154.

Figure 6:
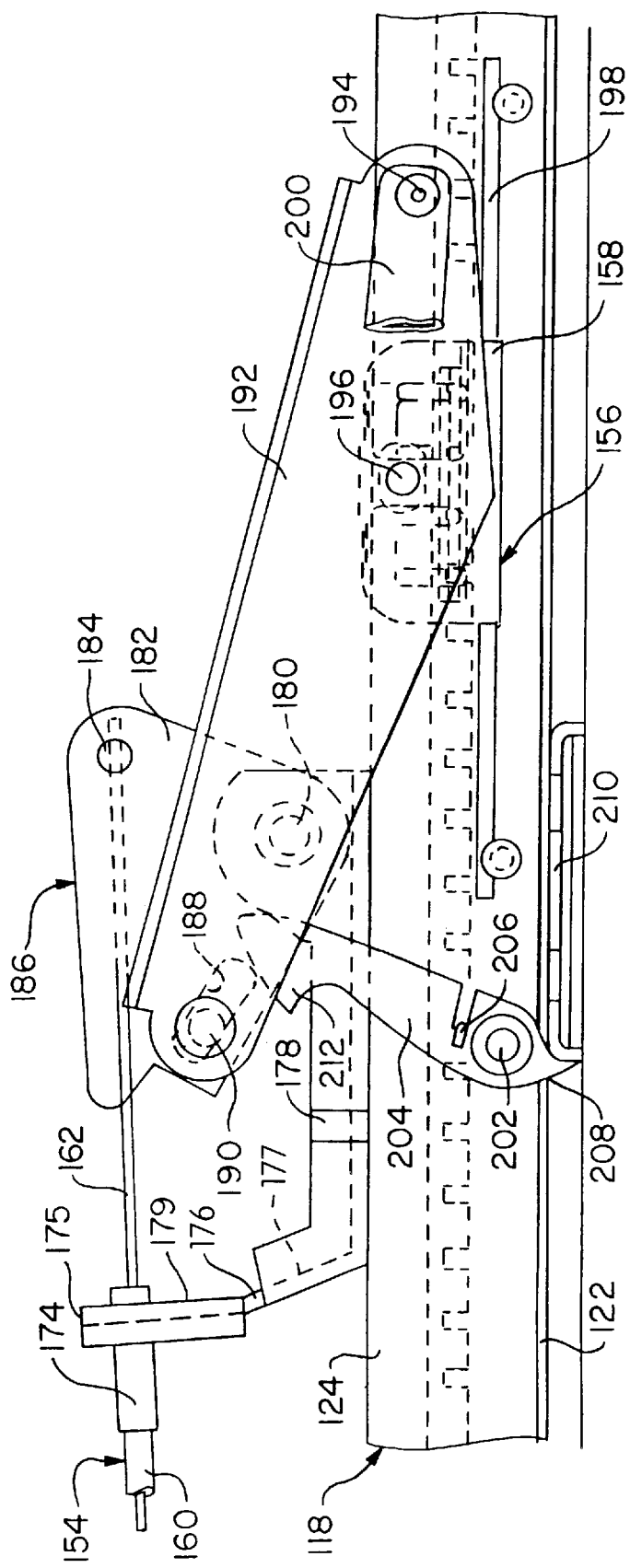
FIG. 6 is a side elevational view of the releasable seat locking mechanism and its cooperation with the Bowden wire assembly showing the releasable locking mechanism in its locking position.
Figure 7:
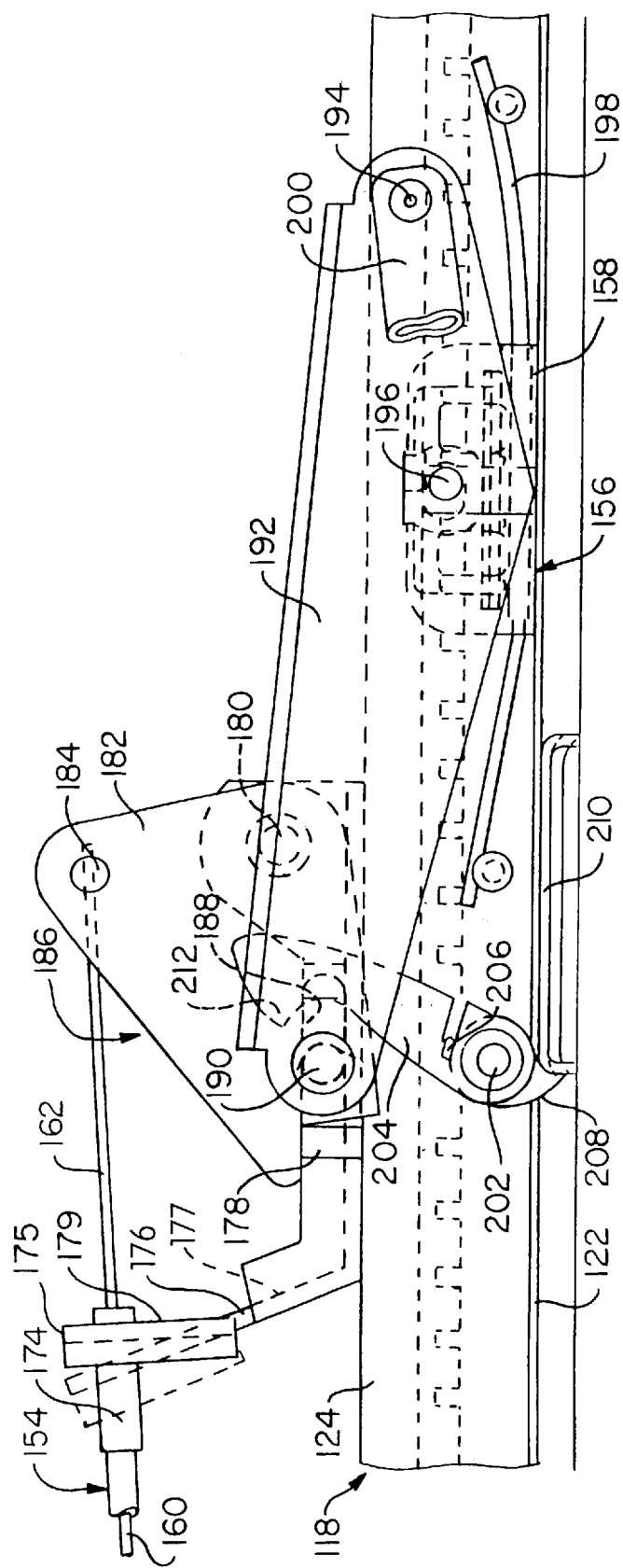
FIG. 7 is a view similar to FIG. 6 showing the releasable seat locking mechanism in its releasing position with the seat still in an operating position.
Figure 8:
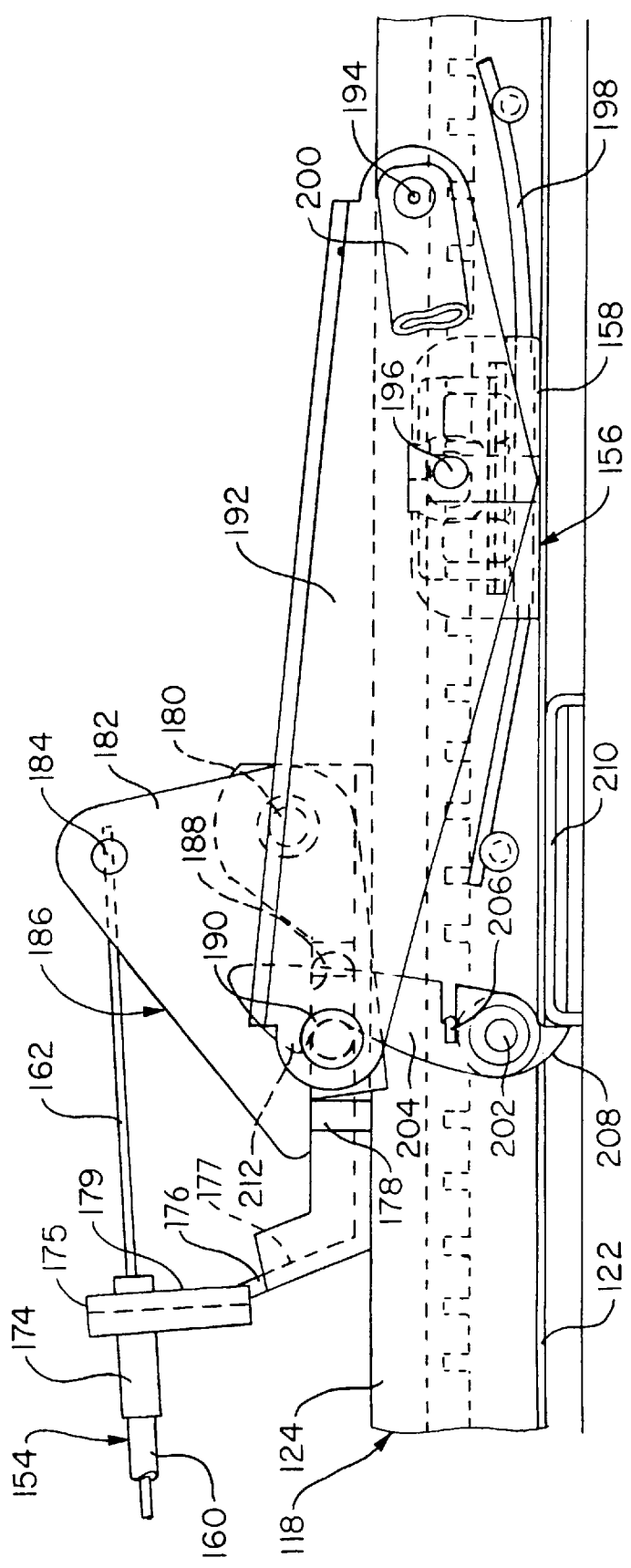
FIG. 8 is a view similar to FIG. 7 with the seat shown in a position moved slightly forwardly of its operating position.

As best shown in FIGS. 6–8, the third corner of the actuating member 182 is formed with a cam slot 188 within which a cam latch pin 190 is slidably disposed. The cam latch pin 190 is fixed in laterally extending relation to one end of an elongated actuating member 192. The opposite end of the elongated actuating member 192 is pivoted, as indicated at 194, to the side of the upper track 124 rearwardly of the locking mechanism 158. As shown, the locking mechanism 156 is constructed in accordance with the disclosure of the aforesaid application Ser. No. 08/527,727, Dkt. No. 133 now U.S. Pat. No. 5,741,000. The elongated actuating member 192 includes a pin 196 which connects with the locking structure 158 of the locking structure 158 to move the same downwardly from its locking position, as shown in FIG. 6, against the bias provided by spring 198. A U-shaped member 200 may be fixed to the elongated actuating member 192 to serve as an actuating member for a corresponding locking mechanism (not shown) for the other set of lower tracks 118.

The motion transmitting mechanism 154 enables the seat 110 of the present invention to be moved through a cycle of access movement which includes a movement of the seat back cushion assembly 114 from a seat back operating position into the seat back access position which releases the seat cushion assembly 112 to be moved forwardly together with the seat back cushion assembly 114 into a seat access position. The cycle also includes a rearward movement of the seat and seat back cushion assemblies 12 and 14 together from the seat access position into a seat operating position and a rearward movement of the seat back cushion assembly from its seat back access position into a seat back operating position.

Mounted on the side of the movable lower track 124 forwardly of the locking mechanism 156 and below the base structure 178 is a laterally extending pivot pin 202 on which a latch member 204 is pivoted. A coil spring 206 surrounding the pivot pin 202 is connected with the latch member 204 to bias the latch member 204 to pivot in a counterclockwise direction as viewed in FIG. 6. The latch member 204 includes a depending abutment or stop structure 208 which is positioned to engage the forward portion of a cooperating abutment or stop structure 210 fixedly associated with the fixed lower track 122 when the seat cushion assembly 112 is moved rearwardly from the seat access position thereof back into a seat access position.

The free end of the latch member 204 is formed with a domed hook shaped configuration 212 in a position to engage over the cam latch pin 190 when the actuating assembly 186 is moved by the Bowden wire assembly 154 into a position to move the locking mechanism 156 into its releasing position.

A blocking mechanism, generally indicated at 214, is operatively associated with the Bowden wire assembly 154 so as to be operable during a cycle of access movement to prevent the seat back cushion assembly 114 from reaching a seat back operating position during the rearward movement of the seat back cushion assembly 114 from the seat back access position thereof in the event that the aforesaid rearward movement of the seat back cushion assembly 114 precedes the rearward movement of the seat and seat back cushion assemblies together into a seat operating position and the movement of the releasable seat locking mechanism 156 into its locking position.

As shown, the blocking mechanism 214 includes an elongated blocking member or lever 216 pivotally mounted at one end of the mounting plate 168, as indicated at 218, to move between an inoperative position and a blocking position. The free end of the blocking member 216 when in its blocking position cooperates with an abutment member 220 fixed to the mounting plate 144 at the lower end portion thereof. As shown, the abutment member 220 is angular or L-shaped in configuration arranged to cooperate with the free end of the blocking member 216 so that one leg limits the upward movement of the blocking member 216 while the other leg provides a forwardly facing abutting surface for engaging a rearwardly facing free end surface of the blocking member 216 to thereby block further rearward pivotal movement of the seat back cushion assembly 114 about its pivot 146.

The blocking member 216 is resiliently biased to move toward its blocking position by a coil spring 222. One end of the spring 222 is connected with an upstanding lug 224 on the mounting plate 168. The other end of the spring 222 is connected to an upstanding lug 226 on the blocking member.

In order to move the blocking member 216 against the bias of the spring 222, there is fixed to the blocking member 216 a pin 228 which extends laterally through a slot 230 in the mounting plate 168. The laterally outwardly spaced head of the pin 228 detachably receives a slide member 232 which is slidably mounted on the portion of the cable 162 extending between the eyelet 170 and tube end 166.

Figure 5:
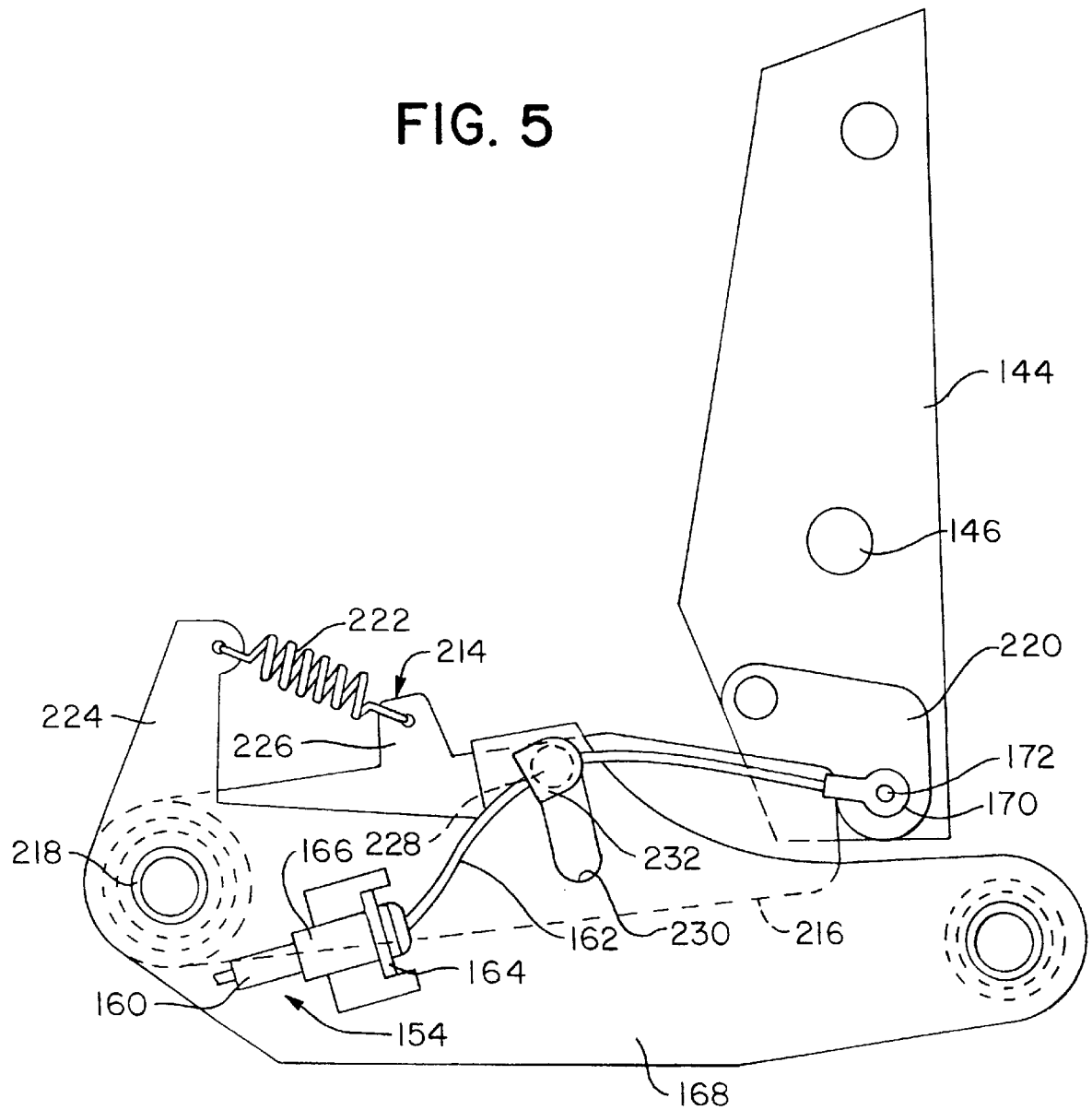
FIG. 5 is a view similar to FIG. 4 showing the blocking mechanism in its blocking position.

When the seat cushion assembly 112 is in a seat operating position, the blocking member 216 is retained in its inoperative position against the bias of the spring 222 by the tension of the end of the able 162 which extends from the eyelet 170 to the tube end 166 in a position to retain the slide member in the position shown in FIG. 5. This position corresponds with a forwardmost seat back operative position in the case of a reclining seat back cushion assembly 114. It will be noted that, as the seat back cushion assembly 114 is moved rearwardly into other reclining positions, the end portion of the cable 162 extending outwardly from the tube end 166 will become slack and even buckle because the opposite end cannot move. This buckling movement however does not result in a movement of the blocking structure 216 because the outer end thereof is in abutting relation to the lower surface of the abutment 220.

A preferred manner of installing the Bowden wire assembly 154 is set forth below.

The installation of the Bowden wire assembly 154 is preferably begun with the seat 10 in its operative position. Specifically, the seat cushion assembly 112 is in an operative position and the seat back cushion assembly 114 is preferably in the forwardmost operative position if the mounting mechanism provides for reclining. This position of the seat back cushion assembly is essentially shown in FIG. 5. It will be noted that the connector 170 of the Bowden wire cable 162 is connected to the pin 172 and extends therefrom through the flexible tube 160. The associated end of the flexible tube 166 is anchored on the bracket 164 as shown. At the opposite end of the Bowden wire assembly, the opposite end 174 of the Bowden wire 160 is connected with the yieldingly deformable bracket 176 with the bracket 176 in the position shown in dotted lines in FIG. 7.

The maximum amount of the Bowden wire cable 162 which extends outwardly of the end 174 of the flexible tube 166 is fixed by the design of the Bowden wire assembly 154. The initial position of the deformable bracket 176 is spaced from the connecting element 184 a distance greater than the maximum extension so that when the end of the Bowden wire cable 162 is connected with the actuating member 182 to the connection element 184, the actuating member 182 will be positioned in a position intermediate the operative and releasing positions thereof. The operative position of the actuating member 182 corresponds with a maximum cable extent limiting position of the Bowden wire cable 162. When the actuating member 182 is in the releasing position shown in FIGS. 7 and 8 wherein the corner adjacent the slot 188 is disposed in engagement with the base structure 178 as a stop member, the end of the Bowden wire cable 162 is in a minimum cable extent limiting position.

The sequence in which the ends of the Bowden wire cable 162 are connected to the movable members 220 and 182 respectively and the sequence of connection of the flexible tube ends 166 and 170 with the brackets 164 and 176 respectively is not critical. It is preferable that the flexible tube connections be made first and then the cable connections although these can be reversed and the cable connections can be made with the movable members to which they are connected while they are at different positions than those previously recited so long as they are moved into the positions previously recited before the next step.

The next step is to move the seat back cushion assembly 114 from its operating position forwardly toward and into its seat back access position. This movement has the effect of moving the portion of the Bowden wire cable 162 extending outwardly from the flexible tube end 166 from its minimum cable extent position toward its maximum cable extent position when the seat back cushion assembly 114 reaches its seat back access position.

Since the actuating member 182 is initially disposed in an intermediate position prior to the movement of the seat back cushion assembly 114 from its operative position, the actuating member 182 will be moved into its releasing position with the corner in engagement with the base structure 178 prior to the seat back cushion assembly 114 reaching the seat back access position. As soon as the movement of the actuating member 182 is stopped, the tensile force in the cable 162 is increased and this increase in the tensile force in the cable is resisted by the flexible tube 160. This resistance by the flexible tube 160 places the flexible tube 160 in compression so that the ends tend to move toward the ends of the cable. Since the bracket 176 is designed to yieldably deform before any of the other connections will move, it is the end of the flexible tube 174 which moves under the compressive load of the flexible tube 160 to yieldingly deform the bracket 176 in a direction toward the adjacent end of the Bowden wire cable 162. When the seat back cushion assembly 114 reaches the seat back access position, the yieldable bracket 176 will have been deformed into its operative position as shown in full lines in FIG. 7 such that the material of the yieldable bracket 176 has been yieldingly deformed beyond an elastic limit thereof. With respect to the deformation of the bracket 176, first it will be noted that the bracket is cantilever mounted with the flexible tube end 166 connected to the free outer end 175. An exemplary material for the bracket 176 is sheet steel preferably constructed, as shown, to provide a flat inner section 177 spaced from the outer free end which is connected with the flexible tube end 166. The portion of the bracket between the inner flat section and the outer free end, indicated at 179 is flanged to allow bending to be induced in the flat section. This construction enables the deformation or bending to be controlled and more predictable. For example, in the embodiment shown in the application of a 200-pound force by the flexible tube end 166 is sufficient to cause the bracket 176 to yield and deform by bending out the inner flat portion thereof.

When it is desired to move the seat 110 into its access position to allow an occupant to enter the rear compartment of the vehicle, the manually engageable structure or lever 150 is manually engaged and moved from its locking position into its releasing position. This manual movement allows the seat back cushion assembly 114 to be moved from its seat back operation position forwardly in a pivotal fashion about the pivotal axis 146 into a seat back access position extending over the seat cushion assembly 112. This movement may be accomplished by the spring 152 although the movement can be achieved manually as well depending on the arrangement utilized.

The movement of the seat back cushion assembly 114 from its seat back operating position into its seat back access position will move the pin 172 connected to the end 170 of the Bowden wire cable 162 rearwardly, so that the associated end portion of the Bowden wire cable will be moved out of the associated end 166 of the flexible tube 160. This movement of the Bowden wire cable 162 will be reflected in an inward movement of the opposite end of the Bowden wire cable within the end 174 of the flexible tube 160. This inward movement of the Bowden wire cable 162 from the maximum extent limiting position shown in FIG. 6, serves to move the actuating member 182 from the operative position shown in FIG. 6 into the releasing position shown in FIGS. 7 and 8.

As the actuating member 182 moves away from its operating position in a counterclockwise direction as viewed in FIG. 6, it carries with it by virtue of the engagement of pin 190 within the slot 188, the elongated actuating member 192. As the elongated actuating member 192 is moved from its operating position in a counterclockwise direction about its pivotal axis 194, the pin 196 serves to move the locking structure 158 of the releasable locking mechanism 156 from its locking position into its releasing position.

When the elongated actuating member 192 reaching a position to release the locking mechanism 156, the pin 190 is positioned in a position just forwardly of the hook-shaped end 112 of the latching member 204. As soon as the releasable locking mechanism 156 is moved into its releasing position, the entire seat 110 can now be moved from its seat operating position forwardly into a seat access position. During the initial portion of this movement, the pivot 202 of the latching member 204 moves forwardly allowing the stop structure 208 to assume a different position with respect to the stop structure 210, thereby allowing the spring 206 to pivot the latching member 204 about its pivot 202 and to therefore move the hook-shaped outer end 212 into a position overlying the pin 190, as shown in FIG. 16. Further forward movement of the seat toward its seat access position can now take place with the locking structure 158 of the locking mechanism 156 releasably latched in its releasing position.

After the seat 110 has reached its seat access position, the seat 110 can be returned in either one of two sequences. The first sequence is where the seat cushion assembly 112 is moved back into its seat operating position and thereafter the seat back cushion assembly 114 is moved from its seat back access position into its seat back operating position. The second mode is where the seat back cushion assembly 114 is moved away from its seat back access position prior to the full movement of the seat cushion assembly 112 to its seat operating position.

In the first instance, it will be noted that as the seat 110 is returned into the seat operating position which it was in when the access cycle was commenced, the stop structure 208 on the latch member 204 will engage the stop structure 210. Further rearward movement of the seat 110 will cause the latch member 204 to pivot in a clockwise direction as viewed in FIG. 6 so as to move the outer hook-shaped end 212 of the latch member 204 out of engagement with the pin 190. It will be noted however that since the seat back cushion assembly 114 is still in its seat back access position, the Bowden wire cable 162 will, by virtue of its tension, retain the actuating member 182 against movement which, in turn, prevents the elongated actuating member 192 from being returned into its operative position. Nevertheless, the seat cushion assembly 112 is positioned at its seat operating position so that as soon as the seat back cushion assembly 114 is moved from the seat back access position thereof into the seat back operating position thereof, the Bowden wire cable 162 will be moved within the flexible tube 160 so as to allow the actuating member 182 to move from the position shown in FIG. 8 to the position shown in FIG. 6 and hence the elongated actuating member 192 from its releasing position into its operative position. The movement of the elongated actuating member 192 into its operating position serves to move the locking structure 158 of the locking mechanism 156 back into its locked position, thus completing an access cycle.

When the second mode of return is undertaken in an access cycle, the seat back cushion assembly 114 is moved away from its seat back access position before the seat cushion assembly 112 is moved back into its operating position. When the seat cushion assembly 112 is out of its operating position, the latch member 204 retains the actuating members 182 and 196 in the position shown in FIGS. 7 and 8, so that as the seat back cushion assembly 114 is moved away from its seat back access position, the pin 172 will be moved forwardly or toward the left as viewed in FIG. 4. Since the opposite end of the Bowden wire cable 162 cannot move by virtue of the fact that latch member 204 is retaining the actuating member 182 in its releasing position, the end portion of the Bowden wire cable 162 extending from the end 166 of the flexible tube 160 becomes slack and begins to buckle. As the slack begins to develop in the end portion of the Bowden wire cable 162, the connecting element 232 on the pin 228 carried by the locking member 216 is moved upwardly within the slot 230 by virtue of the spring 222 biasing the blocking member 216 upwardly. This upward movement of the blocking member 216 is a pivotal movement about pivot 218 in a counterclockwise direction, as viewed in FIG. 4. By this movement, blocking member 216 moves from the inoperative position, shown in FIG. 4, to the blocking position, shown in FIG. 5. In the blocking position, it will be noted that the free end of the blocking member 216 is disposed in a position to engage with the abutment member 220. This prevents the seat back cushion assembly 114 from being fully returned to its seat back operating position. The engagement of the blocking member 216 against the abutment member 220 retains the seat back cushion assembly 114 in an unnatural slightly forwardly inclined position which would be uncomfortable to any seat occupant and would therefore alert the seat occupant that the seat 110 is not in its proper operating position.

As soon as the seat cushion assembly 112 is fully returned into its seat operating position, the bias acting on the actuating assembly 186 will effect the movement of the actuating mechanism 186 from the position shown in FIG. 7 to the position shown in FIG. 6, which movement has the effect of taking up the slack in the end portion of the Bowden wire cable which extends from the end of the flexible tube 166. As the end of the cable 162 is tensioned by this movement, the connecting member 232 on the cable 162 moves the pin 228 downwardly within the slot 230 which, in turn, allows the blocking member 216 to move from its blocking position, as shown in FIG. 5, into its inoperative position, as shown in FIG. 4. As soon as the blocking member 216 moves out of engagement with the abutment member 220, the seat back cushion assembly 114 is allowed to return to its seat back operating position which, in turn, allows the entire actuating assembly 186 to return to its operative position and, hence, the locking structure 158 of the locking mechanism 156 to return to its locked position.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiments have been shown and described for the purpose of illustrating the functional and structural principles of this invention and is subject to change without departure from such principles. Therefore, this invention includes all modifications encompassed within the spirit and scope of the following claims.

What is claimed is:

1. A Bowden wire installation comprising a Bowden wire assembly including an elongated flexible tube having opposite ends and a cable slidably mounted in said flexible tube having opposite end portions which extend outwardly from respective opposite ends of said flexible tube, spaced movable members connected to the opposite end portions of said cable and spaced anchor members connected to opposite ends of said flexible tube, one of said anchor members being disposed in a fixed operative position into which it has been yieldingly deformed from an initial position by movement of the end of the flexible tube connected in fixed relation therewith such that the material of said one of said anchor members is yieldingly deformed beyond an elastic limit thereof.

2. The installation of claim 1 wherein said one anchor member is cantilever mounted bracket having an outer free end to which the end of the flexible tube is connected.

3. The installation of claim 2 wherein said bracket is formed of sheet steel.

4. The installation of claim 3 wherein said bracket includes a flat inner section spaced from said outer free end, the portion of said bracket between said outer free end and said flat inner section being flanged.

* * * * *